(12) United States Patent      (10) Patent No.: US 9,002,660 B2
Mannstein et al.      (45) Date of Patent: Apr. 7, 2015

(54) DEVICE AND METHOD FOR DETERMINING AND INDICATING CLIMATE-RELEVANT EFFECTS OF A CONTRAIL PRODUCED BY AN AIRPLANE

(75) Inventors: Hermann Mannstein, Gilching (DE); Ulrich Schumann, Herrsching (DE)

(73) Assignee: Deutsches Zentrum fur Luft- und Raumfahrt e.V. (DLR e.V.), Cologne (DE)

( * ) Notice: Subject to any disclaimer, the term of this patent is extended or adjusted under 35 U.S.C. 154(b) by 509 days.

(21) Appl. No.: 13/393,724

(22) PCT Filed: Sep. 9, 2010

(86) PCT No.: PCT/DE2010/001060
§ 371 (c)(1),
(2), (4) Date: Mar. 1, 2012

(87) PCT Pub. No.: WO2011/029432
PCT Pub. Date: Mar. 17, 2011

(65) Prior Publication Data
US 2012/0173147 A1    Jul. 5, 2012

(30) Foreign Application Priority Data
Sep. 14, 2009 (DE) .......................... 10 2009 041 190

(51) Int. Cl.
*B64D 45/00* (2006.01)
*B64D 47/08* (2006.01)
*G01W 1/08* (2006.01)

(52) U.S. Cl.
CPC ............... *B64D 45/00* (2013.01); *B64D 47/08* (2013.01); *G01W 1/08* (2013.01)

(58) Field of Classification Search
CPC ....................................................... G01W 1/02
USPC ....................................... 702/3; 340/968, 949
See application file for complete search history.

(56) References Cited

U.S. PATENT DOCUMENTS 3,548,194 A * 12/1970 Astheimer .................... 250/349
5,285,256 A    2/1994 Nelson et al.
(Continued)

FOREIGN PATENT DOCUMENTS

DE            10359868        6/2005
WO    WO 2008/145954 A2   12/2008

OTHER PUBLICATIONS

International Search Report issued in PCT/DE2010/001060 on Feb. 16, 2011.

*Primary Examiner* — John Breene
*Assistant Examiner* — Jeffrey Aiello
(74) *Attorney, Agent, or Firm* — Hoffmann & Baron, LLP

(57) ABSTRACT

The invention relates to a device and a method for determining and indicating, on board of an airplane, climate-relevant effects of a contrail produced by the airplane. The method for determining and indicating, on board of an airplane, climate-relevant effects of a contrail produced by the airplane includes determining radiation data of short-wave and long-wave atmospheric radiation directed upwards in the earth atmosphere at location of the airplane, determining an air temperature and air humidity at the location of the airplane, determining a zenith angle of the sun at the location of the airplane, determining a radiative forcing value produced by the contrail based on the determined radiation data, the air temperature and air humidity, and the zenith angle, and indicating at least one of the radiative forcing value and variables derived therefrom.

14 Claims, 1 Drawing Sheet

(56) References Cited

U.S. PATENT DOCUMENTS

| | | | |
|---|---|---|---|
| 5,457,630 A * | 10/1995 | Palmer | 701/3 |
| 5,546,183 A | 8/1996 | Fegley et al. | |
| 7,557,734 B2 * | 7/2009 | Estrada et al. | 340/963 |
| 2006/0273223 A1 | 12/2006 | Haaland et al. | |
| 2009/0219197 A1 * | 9/2009 | Bunch | 342/26 B |
| 2010/0132330 A1 * | 6/2010 | Noppel et al. | 60/39.5 |
| 2013/0179078 A1 * | 7/2013 | Griffon | 702/3 |

* cited by examiner

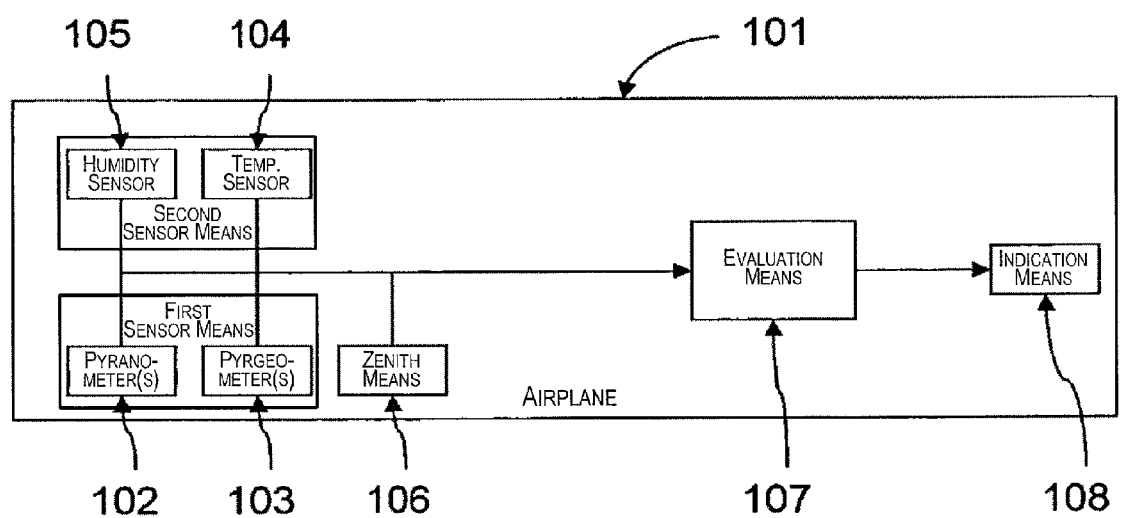

DEVICE AND METHOD FOR DETERMINING AND INDICATING CLIMATE-RELEVANT EFFECTS OF A CONTRAIL PRODUCED BY AN AIRPLANE

CROSS-REFERENCE TO RELATED APPLICATIONS

This application is the U.S. National Phase of, and Applicants claim priority from, International Application Number PCT/DE2010/001060 filed on 9 Sep. 2010 and German Patent Application No. DE 10 2009 041 190.9 filed on 14 Sep. 2009, the disclosures of which are incorporated herein by reference in their entireties.

BACKGROUND

The invention relates generally to the field of civil aviation, and more particularly to a device and to a method for determining and indicating, on board an airplane, climate-relevant effects of a contrail produced by an airplane.

It is known (compare J. E. Penner et al.: "Aviation and the Global Atmosphere" IPCC, 1999, Technical Report, Cambridge University Press) that climate-relevant effects of air traffic are due, in particular, to the following three engine emission products:
water vapour (1.25 kg),
carbon dioxide (3.15 kg), and
nitrogen oxides (5-25 g).

The above details in brackets are approximate details that state the mass of the individual combustion products with combustion of 1 kg of kerosene in modern engines in cruise flight. The climate-relevant effects of the engine emission products are as follows. Carbon dioxide ($CO_2$) and water vapour ($H_2O$) directly act as greenhouse gases. The reactive nitrogen oxides NO, $NO_2$, ($NO_x$), which themselves are not greenhouse gases, influence the formation of ozone ($O_3$), which in turn acts as a greenhouse gas. At a corresponding ambient air temperature and humidity, the emission of water vapour ($H_2O$) from airplane engines furthermore causes the formation of condensation trails or contrails, thus additionally influencing the local radiation balance of the atmosphere.

Contrails often manifest themselves as white "linear clouds" (linear cirrus clouds) behind high-flying airplanes. Depending on environmental conditions, a contrail can exist for several hours and can propagate in such a manner that it makes a transition to a (large-) area-shaped cirrus cloud cover. Investigations have shown that the environmental conditions required for contrail formation occur relatively rarely so that in the overall consideration of air traffic contrail formation results only in approximately 15 percent of all kilometers flown. The visual characteristics of a contrail or the cirrus clouds directly forming therefrom depend on particle emissions of the engine, on particle formation in the exhaust gas stream, and on the environmental conditions. The radiation effect of contrails is highly variable, both in time and in space. At night, contrails heat up the local atmosphere, while during the day they can also have a cooling effect at least over a dark background. The heating radiation effect of contrails can reach an order of magnitude that is comparable to that of the $CO_2$ emitted by airplane engines. The climate-relevant radiation effect of contrails is at present neither directly recorded nor influenced by means of operative measures.

From patent specification DE 103 59 868 B3, a method and a device are known by means of which a contrail forming behind an airplane can be detected. To this effect, cameras arranged in the rear region of the airplane, which cameras point against the direction of flight and are sensitive in the visible and/or infrared spectrum, record image data. By means of suitable evaluation of the recorded image data, it is possible to determine whether contrails have formed behind the airplane. Thus on board an airplane an actual statement can be made as to whether a contrail has formed behind the airplane.

From the article by Mannstein, H., Spichtinger, P., Gierens, K., "A Note on how to avoid contrail cirrus", ELSEVIER Ltd., Transportation Research, Part D, (2005) 10, pp 421-426, it is further known that the environmental conditions required to form contrails, in particular ice supersaturation in the atmosphere, typically occur only in atmospheric layers of little vertical extension, so that a change in the altitude of only +/−2000 ft (610 m) of an airplane flying in such an atmospheric layer reduces the probability of contrails occurring by 50%.

In the state of the art it is thus possible, on board an airplane, to detect whether the airplane generates a contrail at any given time. If a contrail is generated, the airplane can prevent contrail formation by a corresponding change in its flight altitude. With methods known from the state of the art it is, however, not possible to determine on board an airplane climate-relevant effects of a contrail generated by the airplane. In particular, it has hitherto not been possible to detect whether the contrail generated at any given time behind an airplane has an atmosphere-warming effect or an atmosphere-cooling effect.

SUMMARY

It is the object of the present invention to state a device and a method for determining and indicating, on board an airplane, any climate-relevant effects of a contrail produced by the airplane. In this document the term "contrail" is used in a wide sense. The term includes, in particular, also the above-described (large-) area-shaped cirrus clouds that directly result from the contrail.

The invention is set forth in the independent claims. Advantageous improvements and designs form part of the dependent claims. Further characteristics, application options and advantages of the invention are stated in the following description.

SUMMARY OF THE DRAWINGS

In the drawings, the following is shown:
FIG. 1 is a highly schematized representation of a device according to the invention on board an airplane.

DETAILED DESCRIPTION

The device according to the invention for determining and indicating, on board an airplane, any climate-relevant effects of a contrail produced by the airplane comprises: first sensor means for determining radiation data of short-wave and long-wave atmospheric radiation directed upwards in the earth atmosphere at the location of the airplane; second sensor means for determining the air temperature and air humidity at the location of the airplane; a zenith means for determining the actual zenith angle of the sun at the location of the airplane; an evaluation means with which a radiative forcing value produced by the contrail can be determined based on the determined radiation data, the air temperature, the air humidity and the zenith angle; and an indication means for indicating the radiative forcing value and/or variables derived therefrom.

Suitable first and second sensor means are known from the state of the art to the average person skilled in the art and can be selected depending on airplane-specific requirements or regulatory requirements. In this context, preferably high-resolution sensors are used that are polled with as high a scanning rate as possible (for example 1-10 Hz). The short-wave atmospheric radiation can be acquired with the use of so-called pyranometers; it preferably comprises a range of the electromagnetic spectrum with wavelengths <4,000 nm, in particular of 200-3,000 nm. The long-wave atmospheric radiation can be acquired with so-called pyrgeometers; it preferably comprises a range of the electromagnetic spectrum with wavelengths >4,000 nm, in particular of 4,000-45,000 nm. The air temperature and air humidity of the ambient air around the airplane are preferably acquired with the use of sensors that are arranged side by side with little distance between them. Calculation of the actual zenith angle of the sun at the actual location of the airplane preferably takes place based on the actual time and the actual position. The means is thus preferably connectable to a navigation system of the airplane that provides the actual time and the actual airplane position.

The term "radiative forcing" was introduced by the Intergovernmental Panel on Climate Change "IPCC" in order to describe, within the framework of climate studies, any external disturbance to the radiation balance of the climate system earth. Such a disturbance can occur in the form of a change in the concentration of a substance (e.g. greenhouse gases, aerosols) relevant to the radiation balance, in the form of a change in solar irradiance, or in the form of a change in the natural cloud formation as a result of contrails. Each disturbance of the radiation balance has the potential to bring about changes in climate parameters, and thus a new state of equilibrium of the climate system earth. Radiative forcing is typically indicated in watts/$m^2$. Radiative forcing is negative in the case of a disturbance in the radiation balance that has a cooling effect on the atmosphere. Radiative forcing is positive in the case of a disturbance in the radiation balance that has a heating effect on the atmosphere. At the time, the concept of radiative forcing was related, by the IPCC, to disturbances in the global radiation balance relative to pre-industrial radiation balance values. In this document the term "radiative forcing" (radiative forcing value) indicates a disturbance, produced by a contrail, of the local atmospheric radiation balance at the location of the airplane.

For the purpose of determining a radiative forcing value caused by a contrail based on data of short-wave and long-wave atmospheric radiation directed upwards in the earth atmosphere, the air temperature, the air humidity and the zenith angle of the sun, various calculation methods, approximations and parameterisations are known from the state of the art to the average person skilled in the art. Examples are the articles by T. Corti and T. Peter, "A simple model for cloud radiative forcing", in Atmos. Chem. Phys., 9 5751-5758, 2009; Schumann et al., "A contrail cirrus prediction tool", Proc. Intern. Conf. on Transport, Atmosphere and Climate-2 (Aachen and Maastricht) 2009; and presentation: Schumann et al., "A Parametric radiative forcing model for cirrus and contrail cirrus", ESA Atmospheric Science Conference, Barcelona, 7-11 Sep. 2009.

At the present state of knowledge, based on the input data described above, at least a corresponding assessment of the radiative forcing value caused by the contrail can be determined using the evaluation means (e.g., computing device).

Preferably, the indication means is arranged in the cockpit of the airplane in the field of view of the pilot so that the pilot understands whether a contrail generated behind the airplane actually has a cooling or heating effect on the atmosphere, and also understands the extent of this effect at any given time. For this purpose the indication means (e.g., display device) indicates the determined radiative forcing value and/or a variable or information derived therefrom. The pilot can thus, for example, in a targeted manner maintain the flight altitude if a contrail formed behind the airplane has a cooling atmospheric effect. In the case of a heating effect on the atmosphere the pilot can in a targeted manner change the flight altitude until contrail formation no longer occurs. The device according to the invention thus allows targeted influencing, by the pilot, for example on the flight altitude, depending on a desired climate effect, based on a contrail generated by the airplane.

In the present document the determined radiative forcing values preferably relate to the flight distance of the airplane, and are, for example, integrated over the average life of the contrail, and are stated or indicated in the unit GJoule per km. On board the airplane it is thus possible to determine a radiative forcing value for each flight kilometer travelled. It is thus possible to acquire a time series of radiative forcing values from takeoff through to landing of the airplane. This time series then, along the flight path, indicates the disturbance to the local atmospheric radiation balance as a result of contrail formation.

As mentioned above, contrail formation depends not only on the ambient air temperature and humidity, but also on further parameters, for example the particle concentration in the engine exhaust gas and in the ambient air (compare for example: J. E. Penner et al. "Aviation and the Global Atmosphere", chap. 3.2.4, "Contrail and Ice Particle Formation", IPCC 1999, Cambridge University Press, or: F. Immler et al. "Cirrus, contrails, and ice supersaturated regions in high pressure systems at northern mid latitudes" Atmos. Chem. Phy., 8, 1689-1699, 2008). Since these additional parameters actually are not acquired, errors can occur in determining radiative forcing values, if according to an algorithm stored in an evaluation means, based on the actually determined ambient air temperature and humidity, contrail formation results, with this contrail formation however not occurring in reality.

In order to minimize this error as far as possible, the device according to the invention preferably comprises one or several cameras that in the direction of flight point rearwards, and a corresponding automatic image evaluation system for contrail recognition, as disclosed in the above-mentioned patent specification DE 103 59 868 B3. In this improvement of the device according to the invention the image evaluation system is connected to the evaluation system. If the image evaluation system detects contrail formation, this serves to verify the algorithms for contrail formation, which algorithms have been stored in the evaluation system. Preferably, in this case a radiative forcing value is determined only if the image evaluation system has detected contrail formation. Also imaginable in this context are self-learning algorithms for contrail formation, which algorithms are stored in the evaluation system and which continuously optimize themselves based on the actual contrail formation verified by the image evaluation system.

Of course, other methods and devices for verification of actual contrail formation are also useable, for example the use of laser scanning of the region which in flight direction is situated behind the airplane, and with corresponding evaluation of the backscattered signals.

A preferred improvement of the device according to the invention comprises a first interface, by way of which prognostic weather simulation data relating to the environment of the airplane can be provided for the evaluation means. Furthermore, the evaluation means comprises a first module, by means of which, based on the prognostic weather simulation data, the radiation data, the air temperature, the air humidity and the zenith angle a lifespan of the contrail can be determined, as can the entire radiation effect of the contrail integrated over its lifespan. Finally, in this improvement the radiative forcing value is determined by the evaluation means based on the integrated overall radiation effect of the contrail.

Based on the prognostic weather simulation data it is thus possible for the first module to simulate for the future, or predict, the development, in time and in space, of the contrail generated in the atmosphere, dependent on actual weather events. The radiative forcing values generated in this process thus take into account actual weather developments and are thus more realistic or more accurate than radiative forcing values that are determined based on approximations and without any reference to actual weather events. The weather simulation data required for this correspond, for example, to the data as provided by the numerical weather forecasting model of the ECMWF (European Centre for Medium-Range Weather Forecasts) or the German meteorological service (Deutscher Wetterdienst). Calculation of the development in time and space of the contrail based on weather simulation data is based on known approaches which, for example, are used in corresponding trajectory models.

The device according to the invention preferably comprises a receiving unit for wirelessly receiving weather simulation data and for providing the weather simulation data at the first interface. In this manner it can be ensured that calculation of the development in time and space of a contrail by the first module always takes place based on the most up to date weather simulation data. In this context radio transmission of corresponding weather simulation data, for example of the ECMWF weather forecast model, is imaginable. As an alternative, the device can comprise a computer unit on board the airplane, which computer unit generates the prognostic weather simulation data and provides it at the first interface. However, this computer unit requires meteorological initialisation data that is as current as possible, which data is, for example, provided shortly before commencement of the flight.

The lifespan of a contrail can, for example, be assessed from the parameters of humidity, temperature and vertical speed, wherein it is assumed that a contrail will distinguish itself from its surroundings until such time as the so-called Koop-limit for homogeneous ice nucleation has been reached.

The integrated overall radiation effect of the contrail and thus the radiative forcing value is preferably determined in relation to a flight distance, in other words the overall radiation effect or the corresponding radiative forcing value is in each case determined over the lifespan of a contrail sector, for example measuring 1 km in length. As an alternative or in addition, for example by means of summation of the overall radiation effects of the individual contrail sectors, a radiative forcing value relating to the entire contrail generated behind the airplane can be determined and indicated.

A further preferred embodiment of the device according to the invention comprises a second interface, by way of which fuel consumption data of the airplane can be made available to the evaluation means, wherein the evaluation means comprises a second module, by means of which based on the fuel consumption data a radiation effect of greenhouse gases emitted by the airplane can be determined. In this improvement the radiative forcing value determined by the evaluation means, apart from being based on the radiation effect of the contrail, in addition is based on the radiation effect of the emitted greenhouse gases. Radiative forcing generated by the greenhouse gases is largely determined by the fuel consumption alone. As explained above, the greenhouse gases, without exception, generate positive radiative forcing, while contrails, depending on environmental conditions, can generate positive or negative radiative forcing. In this improvement both effects are taken into account and are indicated separately or summed.

The device according to the invention preferably comprises a storage unit for storing determined radiative forcing values and/or variables derived therefrom. Furthermore, a transmitting unit for the wireless transmission, to a receiving station, of the determined radiative forcing values and/or variables derived therefrom can be provided. Both of the above are used for possible subsequent evaluation of the radiative forcing values acquired during the flight.

A second aspect of the invention relates to a method for determining and indicating, on board an airplane, climate-relevant effects of a contrail produced by the airplane.

The method according to the invention comprises the following steps:

determining radiation data of short-wave and long-wave atmospheric radiation directed upwards in the earth atmosphere at the location of the airplane; determining the actual air temperature and the actual air humidity at the location of the airplane; determining the actual zenith angle of the sun at the location of the airplane; determining a radiative forcing value, produced by the contrail, based on the determined radiation data, the air temperature, the air humidity and the zenith angle; and indicating the radiative forcing value and/or variables derived therefrom.

For an explanation of the method according to the invention reference is made to the above information provided in the context of the device according to the invention, which information can analogously also be transferred to the present method.

A first advantageous embodiment of the method is characterized in that with the inclusion of provided prognostic weather simulation data relating to the atmospheric environment of the airplane a first lifespan of the contrail and an overall radiation effect of the contrail, which radiation effect has been integrated over the first lifespan, are determined, and the radiative forcing value is determined based on the integrated overall radiation effect of the contrail.

A second advantageous embodiment of the method is characterized in that with the inclusion of actual fuel consumption data of the airplane a radiation effect of greenhouse gases emitted by the airplane is determined, and the radiative forcing value is additionally determined based on the radiation effect of the emitted greenhouse gases.

Preferably, prognostic weather simulation data can be wirelessly transmitted from a ground station to the airplane where it can be made available. As an alternative or in addition the weather simulation data can be generated and provided on board the airplane. Particularly preferably, the determined radiative forcing values and/or variables derived therefrom are stored on board the airplane and/or are wirelessly transmitted to a ground station.

With air traffic presently showing the highest growth rates of all modes of traffic, its share in global warming will in the foreseeable future continue to increase, as will the necessity to take measures for reducing the effect of air traffic on the climate. The present invention can contribute to reducing damaging climate-relevant effects of air traffic in that already in flight from the combination of radiation measuring, temperature measuring and humidity measuring the radiative forcing expected locally as a result of contrails is evaluated and is available, by way of a display in the cockpit, as a basis for making decisions relating to any changes in flight altitude or in the route. Furthermore, measures that have already been taken during flight planning, i.e. prior to takeoff of the airplane, can be verified in relation to their success.

In summary, from measuring the radiation flow density of short-wave and long-wave atmospheric radiation directed upwards, from the ambient temperature and the ambient humidity in conjunction with the solar position determined by indications relating to position and to time, the radiative forcing of a contrail as it is generated at cruising altitude is assessed or determined. Parameterisation of the radiative forcing, which parameterisation corresponds to this problem, as a function of the visual thickness of a contrail, the temperature, the position of the sun and the radiation flows directed upwards can be taken from the state of the art. The determined radiative forcing value is indicated on a display and is preferably stored for evaluation at a later stage. With the inclusion of a weather forecast, which either prior to the flight corresponding to flight planning provides the atmospheric state in the vicinity of the flight route, or by a linkage to an online weather information system, as conceived, for example, in the project "WxFUSION" of the EU (European Community) EU-FLYSAFE, 2005, by estimating the future development of the contrail, in particular of the expected lifespan of a contrail, it is not only possible to determine the actual radiative forcing, but also the radiation effect integrated over the lifespan of the contrail. The integrated radiation effect, which can be assessed by means of a trajectory model, preferably taking into account the radiation effect of the emitted long-lasting greenhouse gases, which by way of the fuel flow are acquired anyway in the airplane, determines the effect which contrails and resulting cirrus clouds have on the climate.

The invention is of particular economic interest if in the context of efforts to reduce climate change it is not only long-lasting greenhouse gases, so-called "Kyoto gases", but also other anthropogenic influences, for example contrails produced by airplanes, on the climate are taken into account and are incorporated in regulatory measures, for example in emission trading. In this case the present invention can document the efforts relating to climate-effective measures.

Further advantages, characteristics and details are disclosed in the following description which describes one exemplary embodiment. Described and/or illustrated characteristics per se or in any sensible combination form the subject of the invention, if applicable also independently of the claims, and can, in particular, in addition also form the subject of one or several separate application/s. Identical, similar and/or functionally identical components have the same reference characters.

The following are shown:

FIG. 1 shows a diagrammatic view of a device according to the invention for determining and indicating, on board an airplane (101), any climate-relevant effects of a contrail produced by the airplane (101), comprising: first sensor means (102, 103) for determining radiation data of short-wave and long-wave atmospheric radiation directed upwards in the earth atmosphere at the location of the airplane (101); second sensor means (104, 105) for determining the air temperature and air humidity at the location of the airplane (101); a zenith means (106) for determining the actual zenith angle of the sun at the location of the airplane (101); an evaluation means (107) with which a radiative forcing value produced by the contrail can be determined based on the determined radiation data, the air temperature, the air humidity and the position of the sun; and an indication means (108) for indicating the radiative forcing value and/or variables derived therefrom.

The invention claimed is:

1. A device for determining and indicating, on board an airplane, climate-relevant effects of a contrail produced by the airplane, the device comprising:
   a first sensor means for determining radiation data of short-wave and long-wave atmospheric radiation directed upwards in the earth atmosphere at a location of the airplane;
   a second sensor means for determining an air temperature and air humidity at the location of the airplane;
   a zenith means for determining a zenith angle of the sun at the location of the airplane;
   an evaluation means for determining a radiative forcing value produced by the contrail based on the determined radiation data, the air temperature and air humidity, and the zenith angle of the sun; and
   an indication means for indicating at least one of the radiative forcing value and variables derived therefrom.

2. The device according to claim 1, wherein the device further comprises:
   a first interface to provide prognostic weather simulation data relating to environment of the airplane to the evaluation means,
   wherein the evaluation means comprises a first module that, based on the prognostic weather simulation data, the radiation data, the air temperature and air humidity, and the zenith angle, determines at least one of a lifespan of the contrail, and an overall radiation effect of the contrail integrated over its lifespan, and
   wherein the evaluation means determines the radiative forcing value based on the integrated overall radiation effect of the contrail.

3. The device according to claim 2, wherein the device further comprises:
   a receiving unit for wirelessly receiving weather simulation data and for providing the weather simulation data at the first interface.

4. The device according to claim 2, wherein the device further comprises:
   a computer unit for generating and providing the prognostic weather simulation data at the first interface.

5. The device according to claim 1, wherein the device further comprises:
   a second interface to provide fuel consumption data of the airplane to the evaluation means,
   wherein the evaluation means comprises a second module that, based on the fuel consumption data, determines a radiation effect of greenhouse gases emitted by the airplane, and
   wherein the evaluation means determines the radiative forcing value additionally taking into account the radiation effect of the emitted greenhouse gases.

6. The device according to claim 1, wherein the device further comprises:
   a storage unit for storing at least one of the determined radiative forcing value and the variables derived therefrom.

7. The device according to claim 1, wherein the device further comprises:
   a transmitting unit for wirelesssly transmitting the at least one of the determined radiative forcing value and the variables derived therefrom to a receiving station.

8. A method of determining and indicating, on board an airplane, climate-relevant effects of a contrail produced by the airplane, the method comprising:

determining, using a first sensor means, radiation data of short-wave and long-wave atmospheric radiation directed upwards in the earth atmosphere at location of the airplane;

determining, using a second sensor means, an air temperature and air humidity at the location of the airplane;

determining, using a zenith means, a zenith angle of the sun at the location of the airplane;

determining, using an evaluation means, a radiative forcing value produced by the contrail based on the determined radiation data, air temperature and air humidity, and the zenith angle; and indicating, using an indication means, at least one of the radiative forcing value and variables derived therefrom.

9. The method according to claim 8, wherein the method further comprises:

determining, using the evaluation means, based on inclusion of provided prognostic weather simulation data relating to the atmospheric environment of the airplane, at least one of a lifespan of the contrail and an overall radiation effect of the contrail integrated over the lifespan; and determining, using the evaluation means, the radiative forcing value based on the integrated overall radiation effect of the contrail.

10. The method according to claim 9, wherein the method further comprises:

wirelessly receiving, using a receiving unit, weather simulation data from a ground station at the airplane; and making, using the receiving unit, the weather simulation data available on board the airplane for determining and indicating climate-relevant effects of the contrail produced by the airplane.

11. The method according to claim 9, wherein the method further comprises:

generating, using a computer unit, weather simulation data on board the airplane; and making, using the computer unit, the weather simulation data available on board the airplane for determining and indicating climate-relevant effects of the contrail produced by the airplane.

12. The method according to claim 8, wherein the method further comprises:

determining, using the evaluation means, based on inclusion of fuel consumption data of the airplane a radiation effect of greenhouse gases emitted by the airplane; and determining, using the evaluation means, the radiative forcing value based on the radiation effect of the emitted greenhouse gases.

13. The method according to claim 8, wherein the method further comprises:

storing, using a storage unit, at least one of the determined radiative forcing value and variables derived therefrom on board the airplane.

14. The method according to claim 8, wherein the method further comprises:

wirelessly transmitting, using a transmitting unit, the at least one of the determined radiative forcing value and variables derived therefrom to a ground station.

* * * * *